(No Model.)  4 Sheets—Sheet 1.

A. L. RICH.
SYSTEM OF SUPPLYING WATER TO LOCOMOTIVES.

No. 553,967. Patented Feb. 4, 1896.

Witnesses:
John W. Robinson,
Stewart H. Ralston.

Inventor:
Abraham L. Rich.

(No Model.) 4 Sheets—Sheet 2.
A. L. RICH.
SYSTEM OF SUPPLYING WATER TO LOCOMOTIVES.
No. 553,967. Patented Feb. 4, 1896.

Witnesses:
John W. Robinson,
Stewart H. Ralston.

Inventor:
Abraham L. Rich.

(No Model.)   4 Sheets—Sheet 3.
A. L. RICH.
SYSTEM OF SUPPLYING WATER TO LOCOMOTIVES.
No. 553,967.   Patented Feb. 4, 1896.
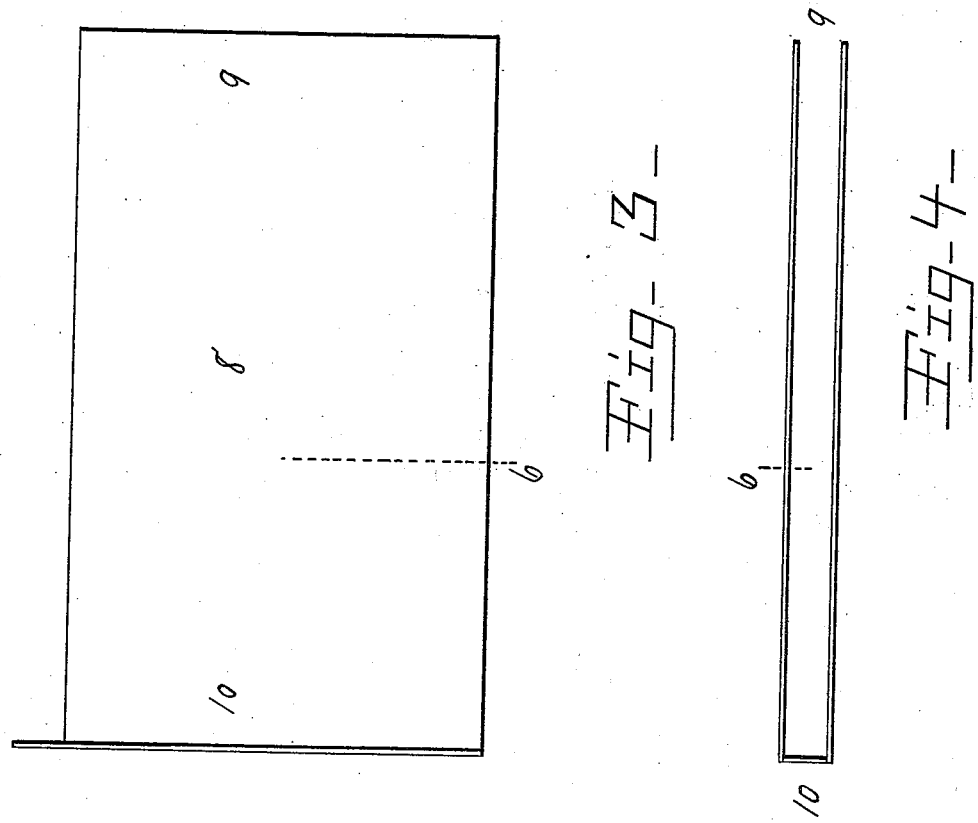

(No Model.)
A. L. RICH.
SYSTEM OF SUPPLYING WATER TO LOCOMOTIVES.
No. 553,967. Patented Feb. 4, 1896.
4 Sheets—Sheet 4.
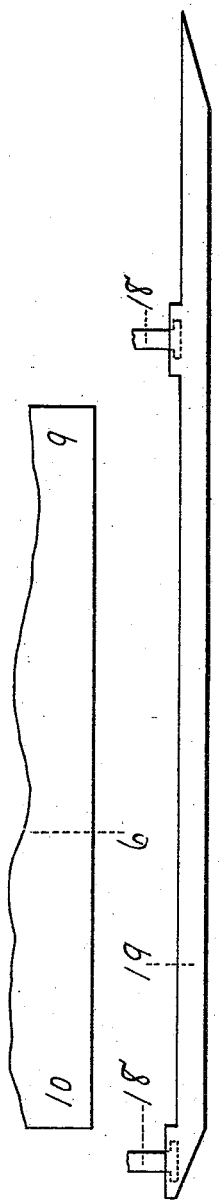
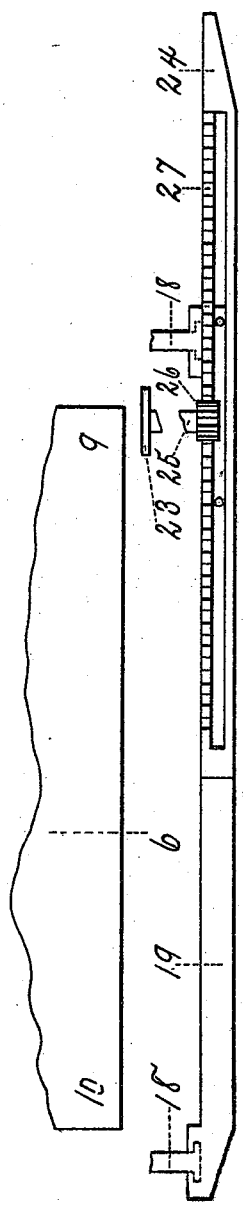
Witnesses:
John W. Robinson,
Stewart H. Ralston.
Inventor:
Abraham L. Rich.

UNITED STATES PATENT OFFICE.

ABRAHAM L. RICH, OF PITTSBURG, PENNSYLVANIA.

SYSTEM OF SUPPLYING WATER TO LOCOMOTIVES.

SPECIFICATION forming part of Letters Patent No. 553,967, dated February 4, 1896.

Application filed May 8, 1895. Serial No. 548,601. (No model.)

*To all whom it may concern:*

Be it known that I, ABRAHAM L. RICH, a citizen of the United States, residing at Pittsburg, in the county of Allegheny and State of Pennsylvania, have invented a new and useful System of Supplying Water to Locomotives, of which the following is a specification, accompanied by drawings, in which—

Figure 1:
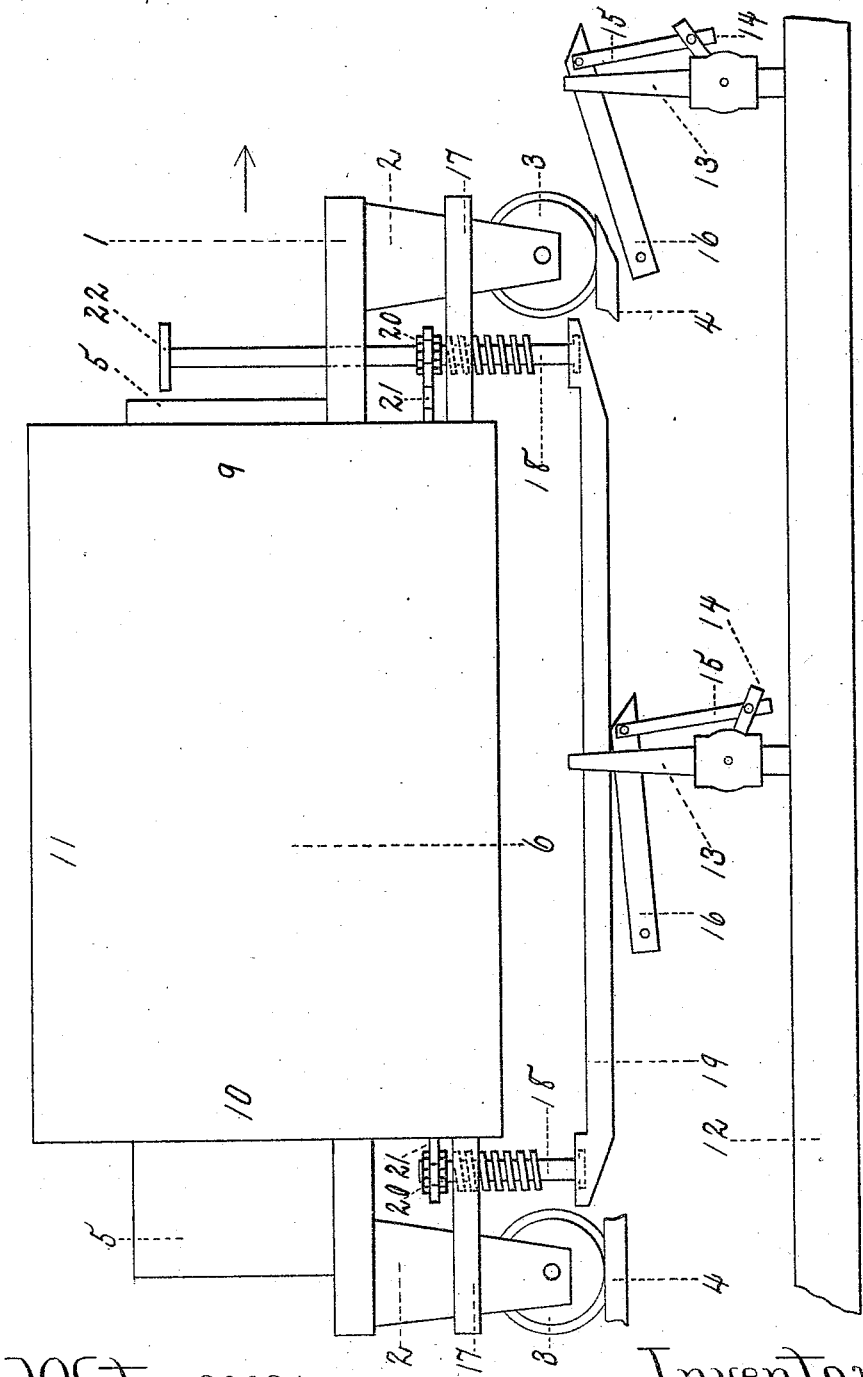
Figure 2:
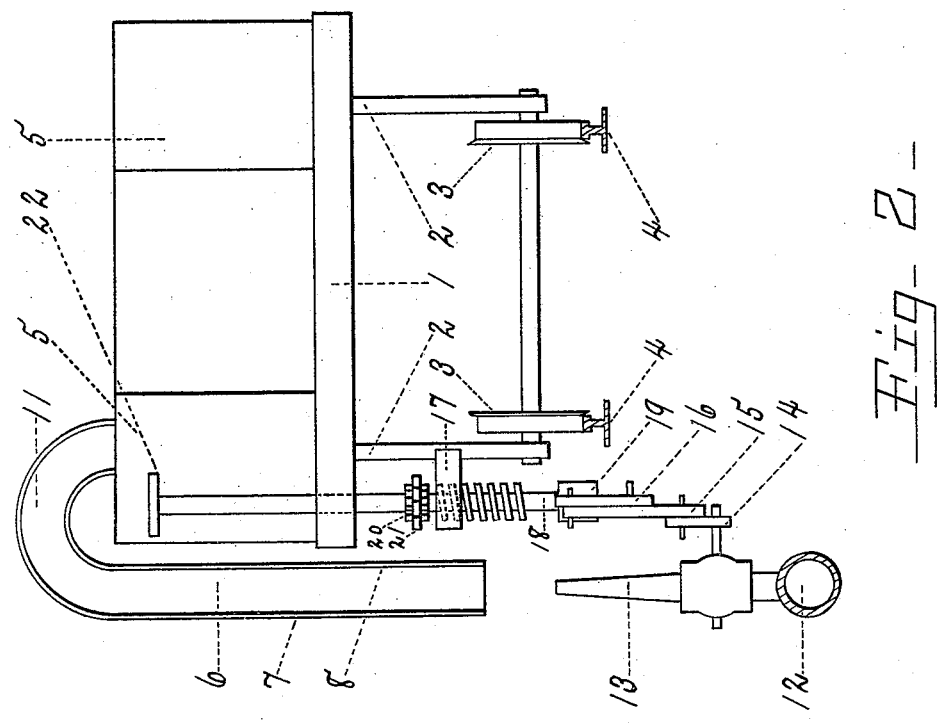

Figure 1 is a side view of a locomotive tank or tender and associated apparatus constructed for supplying water and storing the same. Fig. 2 is an end view of Fig. 1. Figs. 3, 4, 5, and 6 are details.

My invention relates to means for supplying water to locomotives.

Referring to the drawings, 1 represents the car or motor frame supported by pedestals 2 and 2 and wheels 3 and 3 resting on the usual bearing-rails 4 of the track. Suitably disposed on the car or motor is a water-reservoir 5. Attached to side of the water-reservoir 5 is a water-inductor 6, disposed longitudinally to the track, said water-inductor having a length, preferably, substantially the length of said water-reservoir—say fifteen feet, more or less. The said water-inductor 6 has a longitudinal open entrance, said entrance having a length, preferably, substantially the length of said water-inductor. By a "longitudinal" entrance I mean an entrance which is longitudinal with the length of said water-inductor 6, the water-reservoir 5, the car or motor 1, and to the track. By an "open" entrance I mean an entrance which is open throughout the length of said entrance, an entrance which is open continuously for the induction of the water, and an entrance which is also open continuously to the atmosphere. Further, by an "open" entrance I mean an entrance which is open for the induction of the water, and that said entrance is also open to the atmosphere while the water is being inducted.

Within said water-inductor 6, provided with the longitudinal open entrance described in the above paragraph, there can be no fluid-pressure, such as can be produced in a closed vessel, or in a chamber rendered substantially fluid-tight by a substantially fluid-tight connection or union of separable members.

The water-inductor 6 is constructed so as to induct the water to the water-reservoir 5 without said water-inductor appreciably decreasing the velocity of said water, and consequently interposing no considerable resistance thereto, nor causing accumulation thereof or pressure therein while being inducted to said water-reservoir.

The detail drawings, Figs. 3 and 4, illustrate the above, Fig. 3 being a side view of the water-inductor 6 with the outer side wall, 7, removed, showing the inner side wall, 8; and Fig. 4 is a bottom view of said water-inductor.

The forward end, 9, of the water-inductor 6 is preferably open, and the back end, 10, of said water-inductor is preferably closed for a purpose hereinafter stated.

The upper part, 11, of the water-inductor 6 is preferably oblique, angular, or curved, thereby constituting a deflector-surface whereby the water is diverted into the water-reservoir 5, without, as hereinbefore stated, said water-inductor appreciably decreasing the velocity of said water, and consequently interposing no considerable resistance thereto nor causing accumulation thereof or pressure therein while being inducted to said water-reservoir.

Suitably disposed and extending along the track a desired distance is a supply-conductor 12, through which the water is transmitted under pressure. At regular intervals along said supply-conductor 12 are supply-nozzles 13, preferably tapering or conical in shape, disposed vertically, the eduction-orifices thereof terminating at about the height of the bearing-rails 4, said supply-nozzles being provided with, preferably, self-closing valves, having valve-rods 14 pivotally attached to connecting-rods 15, said connecting-rods being pivotally attached to valve-levers 16, and said valve-levers being pivotally attached to suitable bases or fulcrums. Said supply-nozzle valves, valve-rods, connecting-rods and valve-levers, or their equivalents, constitute valve mechanism constructed to be operated by valve-operating mechanism described below.

Disposed longitudinally and attached to the pedestals 2 is a frame-bar 17, through which pass screw-threaded bolts 18, the lower extremities of said bolts terminating in annular heads rotatively attached to the throttle-bar 19. Attached to the screw-threaded bolts 18 are sprocket-wheels 20, engaging with and connected by a sprocket-chain 21, whereby the vertical movement of said screw-threaded bolts 18 will be coincident and the horizontality of the throttle-bar 19 will be maintained when rotary motion is imparted by a throttle-wheel 22 attached to one of said bolts.

The members described in the above paragraph, or the equivalent of said members, constitute valve-operating mechanism constructed to operate the valve mechanism hereinbefore described.

The supply-nozzles through which the water is emitted can be disposed at intervals of, say, one, three, six, ten or fifteen feet, or any desirable distance.

The approach of the back end of the water-inductor to the supply nozzle or nozzles from which water is being taken is coincident with the advance of the forward end thereof on the succeeding supply nozzle or nozzles.

The water in the supply-conductor 12 can be maintained at any desirable pressure—say ten, fifteen, two hundred or more pounds to the square inch.

The operation of my invention as above described is as follows: On revolving the throttle-wheel 22 the throttle-bar 19 is depressed and said throttle-bar, coincidently with the advance of the car or motor, successively depresses the valve-levers 16, thereby, through the medium of the connecting-rods 15 and valve-rods 14, opening the supply-nozzle valves, enabling water to be emitted from the eduction-orifices of the supply-nozzles to which said valves are attached, enter the water-inductor 6, whence it is inducted to the water-reservoir 5. The water-inductor, constructed as hereinbefore described, inducts the water to the water-reservoir without said water-inductor coming in contact with the supply-nozzles, thereby resulting in a manifest advantage in obviating adjustments, contacts, fluid-tight connections, leakage and breakage and wear incident to contact and rubbing.

My invention, however, is not limited to a construction in which the water-inductor is not in contact with the supply-nozzles, as the apparatus is also operative when in contact; and although contact is unnecessary and the manifest advantages attainable by non-contact, as recited in the preceding paragraph, would not be secured, nevertheless great advantage would exist over an apparatus in which a contact is necessary.

The supply-nozzles can have a length that will permit of an efficient angular decrease of the lateral dimensions thereof—say from one to six or more feet—the induction-orifices having sufficient area to introduce enough water to produce desired velocity at the eduction-orifices—say a velocity five, ten, fifteen, or more times greater than would be attained if discharged through a pipe of uniform area.

Supply-nozzles shaped as above described would be capable of emitting the motive fluid at a high velocity, enabling it to pass therefrom to the water-reservoir with a minimum loss thereof.

The apparatus can be arranged singly or plurally.

The supply-conductor 12 and members connected therewith can be disposed along the track any desired distance—say from one or two hundred to ten or twelve hundred or more feet.

The valve-operating mechanism can be adjusted to take water at each supply-station, and can be arranged to operate automatically, taking water when the amount thereof in the water-reservoir is the minimum amount intended to be carried, and discontinuing the reception thereinto when the amount therein has attained the maximum amount intended to be carried therein; or can be worked manually. The water-inductor is also operative when provided with but one side wall—namely, the outer side wall 7.

The valve-operating mechanism can be constructed so that it can open the supply-nozzle valves in advance of the water-inductor, thereby affording the water sufficient time to be emitting at capacity of supply-nozzles, when said water-inductor reaches said supply-nozzles. This can be accomplished by constructing the throttle-bar so that said throttle-bar will have a length in excess of the length of the water-inductor.

The excess of length of the throttle-bar, as above stated, can be permanent or variable, as shown in Figs. 5 and 6, respectively, in the latter instance constructed so as to be extensible, the operation of said extensible construction being as follows: On the hand-wheel 23 being turned, longitudinal motion is imparted to the extensor throttle-bar 24, through the medium of the extensor-rod 25 and gear-wheel 26 attached to said extensor-rod and working into the rack 27 with which said extensor throttle-bar is provided, thereby adjusting said extensor throttle-bar to desired excess of length, above recited. Said extension adjustment of throttle-bar can correspond to speed at which car or motor is moving, and can be arranged to operate automatically or otherwise.

For the purpose hereinbefore recited to be hereinafter stated—namely, to facilitate the induction of water, especially while the locomotive is moving at a high rate of speed—the forward end, 9, of the water-inductor 6 is preferably open, and the back end, 10, of said water-inductor is preferably closed, whereby water is not thrown aside by said forward end, 9, and does not escape at said back end, 10.

To neutralize any resultant effect on water struck by the back end, 10, of the water-inductor 6, the supply-nozzles 13 can be inclined slightly backward—that is to say, in the direction whence advances the car or motor—and also said back end, 10, can be inclined backward for same purpose.

By the use of supply apparatus, as hereinbefore set forth, locomotives can be supplied with water while moving at any speed of which they are capable, or when remaining stationary on supply-stations.

Having described my invention, what I claim, and desire to secure by Letters Patent, is—

1. A locomotive or car having a water-reservoir thereon, and a water-inductor disposed longitudinally to the track and having a longitudinal open entrance, in combination with a supply-conductor and a supply-nozzle, said water-inductor not in contact with said supply-nozzle, whereby water can be supplied without stopping said locomotive or car, substantially as herein set forth.

2. A locomotive or car having a water-reservoir thereon, a water-inductor disposed longitudinally to the track and having a longitudinal open entrance, and valve-operating mechanism, in combination with a supply-conductor and a supply-nozzle provided with valve mechanism operated by said valve-operating mechanism, said water-inductor not in contact with said supply-nozzle, whereby water can be supplied without stopping said locomotive or car, substantially as herein set forth.

3. A locomotive or car having a water-reservoir thereon, and a water-inductor disposed longitudinally to the track and having a longitudinal open entrance, in combination with a supply-conductor and a series of supply-nozzles, said water-inductor not in contact with said supply-nozzles, whereby water can be supplied without stopping said locomotive or car, substantially as herein set forth.

4. A locomotive or car having a water-reservoir thereon, a water-inductor disposed longitudinally to the track and having a longitudinal open entrance, and valve-operating mechanism, in combination with a supply-conductor and a series of supply-nozzles provided with valve mechanism operated by said valve-operating mechanism, said water-inductor not in contact with said supply-nozzles, whereby water can be supplied without stopping said locomotive or car, substantially as herein set forth.

5. A locomotive or car having a water-reservoir thereon, a water-inductor disposed longitudinally to the track and having a longitudinal open entrance, and valve-operating mechanism constructed so as to open the valves operated thereby a desired period of time in advance of the arrival of said water-inductor, in combination with a supply-conductor and a series of supply-nozzles provided with valve mechanism operated by said valve-operating mechanism, said water-inductor not in contact with said supply-nozzles, whereby water can be supplied without stopping said locomotive or car, substantially as herein set forth.

6. A locomotive or car having a water-reservoir thereon, and a water-inductor disposed longitudinally to the track and having a longitudinal open entrance and an open forward end, in combination with a supply-conductor and a series of supply-nozzles, said water-inductor not in contact with said supply-nozzles, whereby water can be supplied without stopping said locomotive or car, substantially as herein set forth.

7. A locomotive or car having a water-reservoir thereon, and a water inductor disposed longitudinally to the track and having a longitudinal open entrance, said entrance also open to the atmosphere while the water is being inducted, in combination with a supply-conductor and a supply-nozzle, said water-inductor not in contact with said supply-nozzle, whereby water can be supplied without stopping said locomotive or car, substantially as herein set forth.

8. A locomotive or car having a water-reservoir thereon, and a water-inductor disposed longitudinally to the track and having a longitudinal open entrance, said entrance also open to the atmosphere while the water is being inducted, in combination with a supply-conductor and a supply-nozzle, whereby water can be supplied without stopping said locomotive or car, substantially as herein set forth.

ABRAHAM L. RICH.

Witnesses:
JOHN W. ROBINSON,
STEWART H. RALSTON.